United States Patent
Ibrahim

(10) Patent No.: US 9,261,601 B2
(45) Date of Patent: Feb. 16, 2016

(54) SYSTEM AND METHOD FOR LANE BOUNDARY ESTIMATION AND HOST VEHICLE POSITION AND ORIENTATION

(71) Applicant: Faroog Ibrahim, Dearborn Heights, MI (US)

(72) Inventor: Faroog Ibrahim, Dearborn Heights, MI (US)

(73) Assignee: SAVARI, INC., Santa Clara, CA (US)

( * ) Notice: Subject to any disclaimer, the term of this patent is extended or adjusted under 35 U.S.C. 154(b) by 178 days.

(21) Appl. No.: 13/907,864

(22) Filed: Jun. 1, 2013

(65) Prior Publication Data
US 2014/0358321 A1    Dec. 4, 2014

(51) Int. Cl.
G01S 19/00    (2010.01)
G01S 19/39    (2010.01)
G01S 19/14    (2010.01)

(52) U.S. Cl.
CPC ........ *G01S 19/39* (2013.01); *G01S 19/14* (2013.01)

(58) Field of Classification Search
CPC ................................. G01S 19/39; G01S 19/14
See application file for complete search history.

(56) References Cited

U.S. PATENT DOCUMENTS

| | | | |
|---|---|---|---|
| 6,850,841 B1* | 2/2005 | Casino | 701/461 |
| 2001/0020216 A1* | 9/2001 | Lin | 701/216 |
| 2005/0004753 A1* | 1/2005 | Weiland et al. | 701/208 |
| 2012/0095682 A1* | 4/2012 | Wilson | 701/532 |
| 2013/0173115 A1* | 7/2013 | Gunia et al. | 701/41 |

* cited by examiner

*Primary Examiner* — James Trammell
*Assistant Examiner* — Adam Mott
(74) *Attorney, Agent, or Firm* — MAXVALUEIP LLC

(57) ABSTRACT

Lane Boundary Estimation and Host Vehicle Position and Orientation, within the host lane estimation, using V2V (vehicle to vehicle) system, are discussed here. Lane boundary detection and tracking is essential for many active safety/ADAS application. The lane boundary position enables the tracking of the host vehicle position and orientation inside the lane. It also enables classifying in-lane, adjacent lanes, and other lanes vehicles. These two functionalities (lane boundary estimation and vehicle lane classifications) enable active safety applications (such as LDW, FCW, ACC, or BSD). It also enables the lateral control of the vehicle for lane keeping assist system, or for full lateral control for automated vehicle (automated for one or multiple lane changes).

26 Claims, 17 Drawing Sheets

SYSTEM AND METHOD FOR LANE BOUNDARY ESTIMATION AND HOST VEHICLE POSITION AND ORIENTATION

RELATED APPLICATION

We have filed another related application earlier, titled "System and method for node adaptive filtering and congestion control for safety and mobility applications toward automated vehicles system", copending now at the USPTO, with the same inventor(s) and assignee, and a related subject matter. We incorporate all the teaching of the prior application above, by reference, including any Appendix or figures.

BACKGROUND OF THE INVENTION

The present invention relates to a system that uses the Vehicle to Vehicle and/or the Vehicle to infrastructure communication for safety and mobility applications. The invention provides methods for lane boundary estimation and even some LDW functionality using V2V and/or V2I systems.

Dedicated Short Range Communication (DSRC) is the main enabling technology for connected vehicle applications that will reduce vehicle crashes through fully connected transportation system with integrated wireless devices and road infrastructure. In such connected system, data among vehicles and with road infrastructure will be exchanged with acceptable time delay. DSRC is the enabler for the V2X communication and provides 360 degrees field of view with long range detection/communication capability up to 1000 meter. Data such as vehicle position, dynamics and signals can be exchanged among vehicles and road side equipments, which make the deployment of safety applications, such as crash avoidance systems (warning and control), possible. V2X technology will complement and get fused with the current production crash avoidance technologies that use radar and vision sensing. V2V will give drivers information needed for safer driving (driver makes safe decisions) on the road that radar and vision systems cannot provide. This V2X capability, therefore, offers enhancements to the current production crash avoidance systems, and also enables addressing more complex crash scenarios, such as those occurring at intersections. This kind of integration between the current production crash avoidance systems, V2X technology, and other transportation infrastructure paves the way for realizing automated vehicles system.

The safety, health, and cost of accidents (on both humans and properties) are major concerns for all citizens, local and Federal governments, cities, insurance companies (both for vehicles and humans), health organizations, and the Congress (especially due to the budget cuts, in every level). People inherently make a lot of mistakes during driving (and cause accidents), due to the lack of sleep, various distractions, talking to others in the vehicle, fast driving, long driving, heavy traffic, rain, snow, fog, ice, or too much drinking. If we can make the driving more automated by implementing different scale of safety applications and even controlling the motion of the vehicle for longer period of driving, that saves many lives and potentially billions of dollars each year, in US and other countries. We introduce here an automated vehicle infrastructure and control systems and methods. That is the category of which the current invention is under, where V2X communication technology is vital component of such system, with all the embodiments presented here and in the divisional cases, in this family.

SUMMARY OF THE INVENTION

Lane Boundary Estimation and Host Vehicle Position and Orientation, within the host lane estimation, using V2V (vehicle to vehicle) and/or V2I (vehicle to infrastructure) system, are presented here. Lane boundary detection and tracking is essential for many active safety/ADAS application. It is also very essential for any level of automated system. The lane boundary position enables the tracking of the host vehicle position and orientation inside the lane. It also enables classifying in-lane, adjacent lanes, and other lanes vehicles. These two functionalities (lane boundary estimation and vehicle lane classifications) enable active safety applications (such as LDW, FCW, ACC, or BSD). It also enables the lateral control of the vehicle for lane keeping assist system, or for full lateral control for automated vehicle (automated for one or multiple lane changes). Current technologies for lane boundary detection and tracking are mainly vision-based.

An embodiment for this invention is a method for lane boundary estimation, and even some LDW functionality, using V2V and or V2I system. Some of the features of this embodiment are due to the following:

1—In an automated system, it will be very difficult to detect and track all lane boundaries using a vision system, due to multiple reasons: limited Field of View (FOV) coverage, difficulty seeing lane marking in high traffic scenario, or challenges facing vision system in different environment conditions (poor lane marking, challenging weather, such as ice, snow, or leaves, challenging lighting conditions, upcoming curves at nights, or the like).

2—Poor availability of LDW system in the above conditions, stated in section 1.

3—V2V active safety systems/ADAS are for vehicle to vehicle threat type, and not intended for road attribute threat type, such as drifting away in your lane, as in LDW system. Therefore, having such system using V2V only may save a vision system cost for lane boundary detection and/or LDW.

DETAILED DESCRIPTION OF THE PREFERRED EMBODIMENTS

Figure 1:
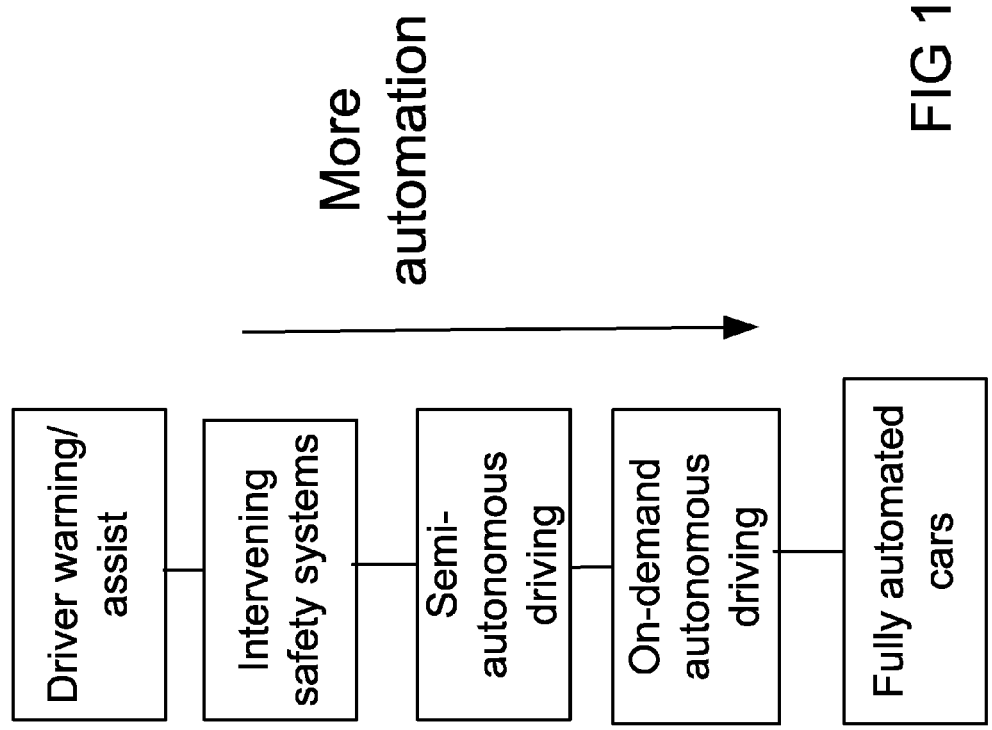
FIG. 1 is for one embodiment, as an example, for representation of development of fully automated vehicles, in stages.
Figure 2:
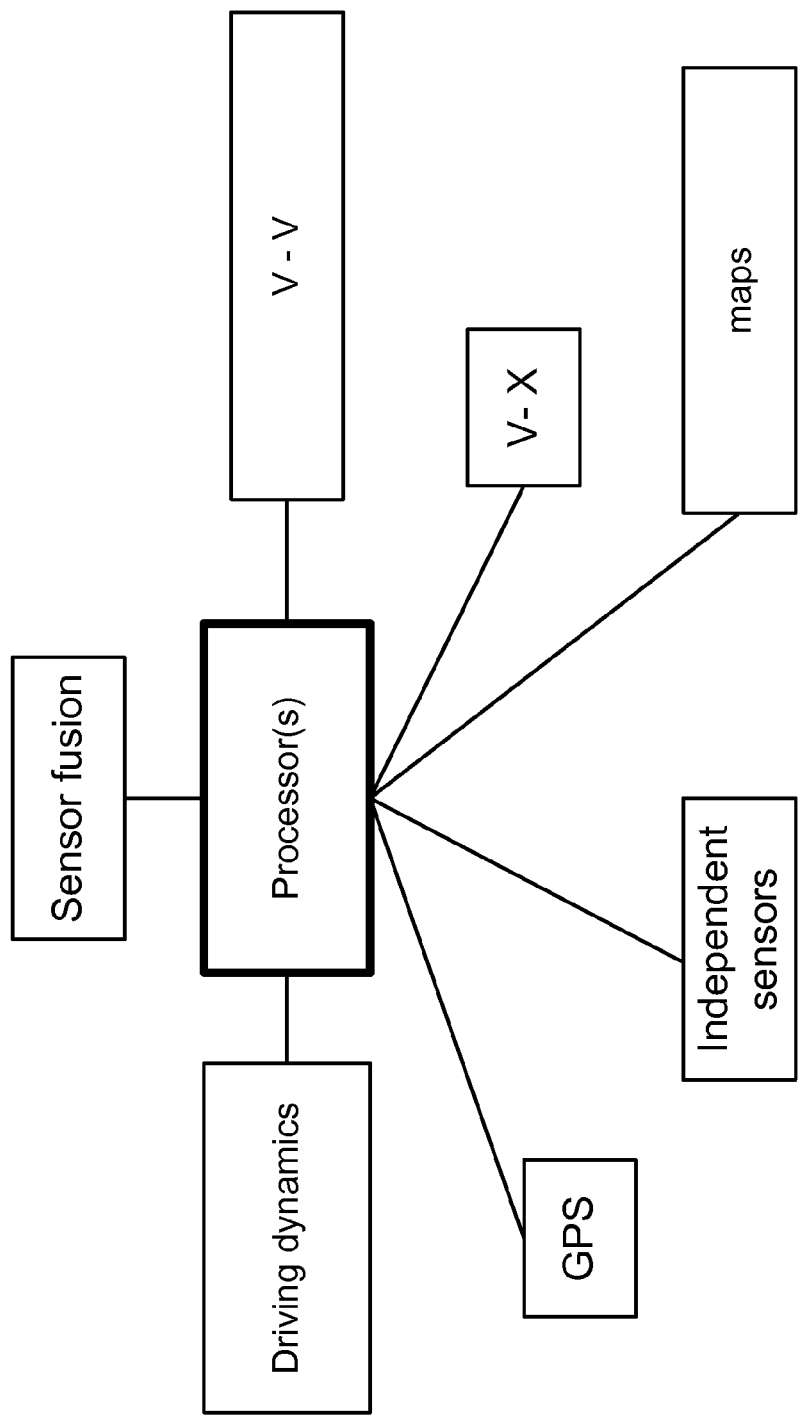
FIG. 2 is for one embodiment of the invention, for a system for automated vehicles.

FIG. 1 is for one embodiment, as an example, for representation of development of fully automated vehicles, in stages, for progression toward fully automated vehicles. FIG. 2 is for one embodiment of the invention, for a system for automated vehicles, using GPS, independent sensors, and maps, for vehicle interactions, driving dynamics, and sensor fusions and integrations.

Figure 3:
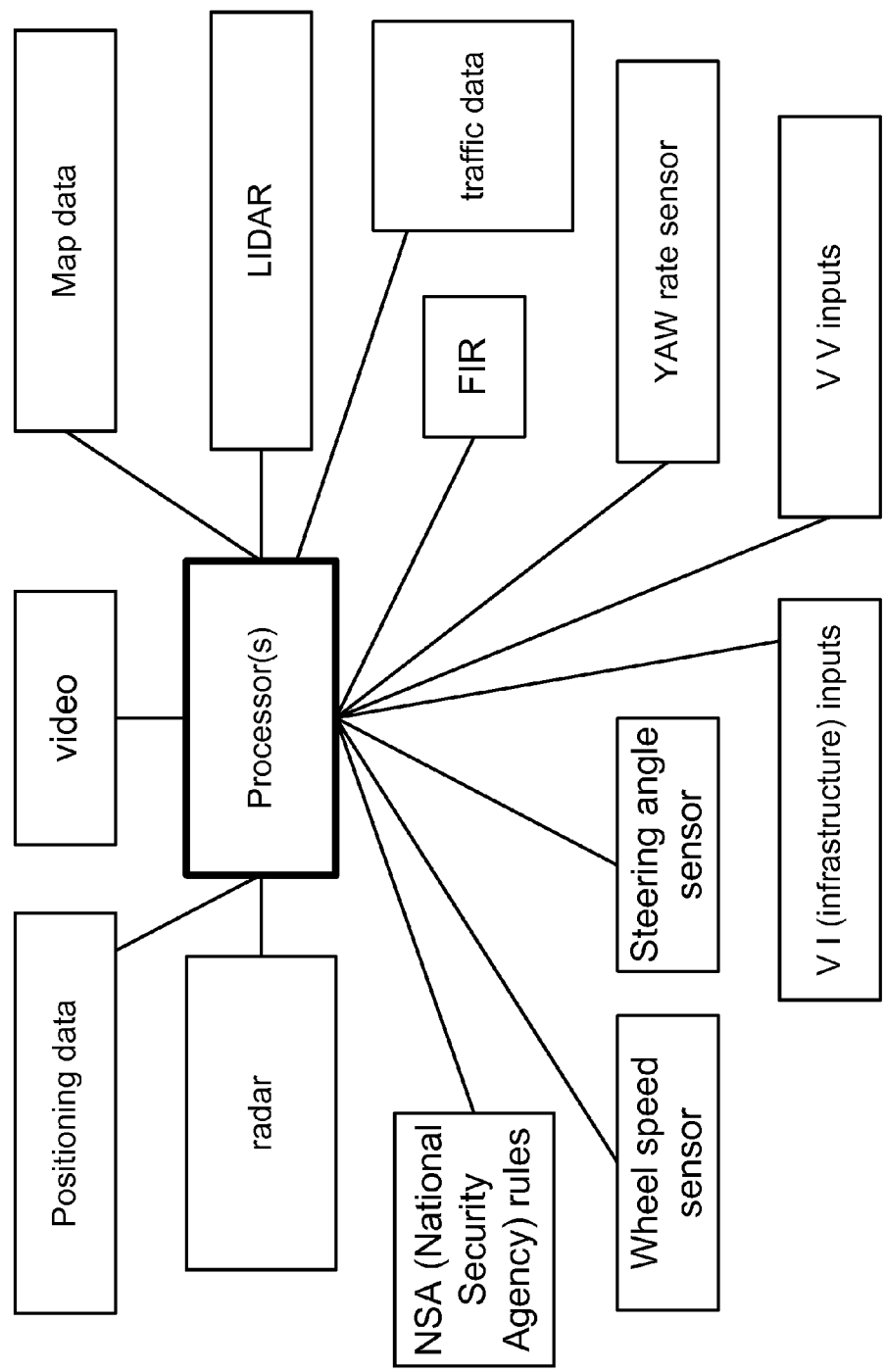
FIG. 3 is for one embodiment of the invention, for a system for automated vehicles.

FIG. 3 is for one embodiment of the invention, for a system for automated vehicles, with different measurement devices, e.g., LIDAR (using laser, scanner/optics, photodetectors/sensors, and GPS/position/navigation systems, for measuring the distances, based on travel time for light), radar, GPS, traffic data, sensors data, or video, to measure or find positions, coordinates, and distances. The government agencies may impose restrictions on security and encryption of the communications and data for modules and devices within the system, as the minimum requirements, as the hackers or terrorists may try to get into the system and control the vehicles for a destructive purpose. Thus, all of our components are based on those requirements imposed by the US or other foreign governments, to comply with the public safety.

Figure 4:
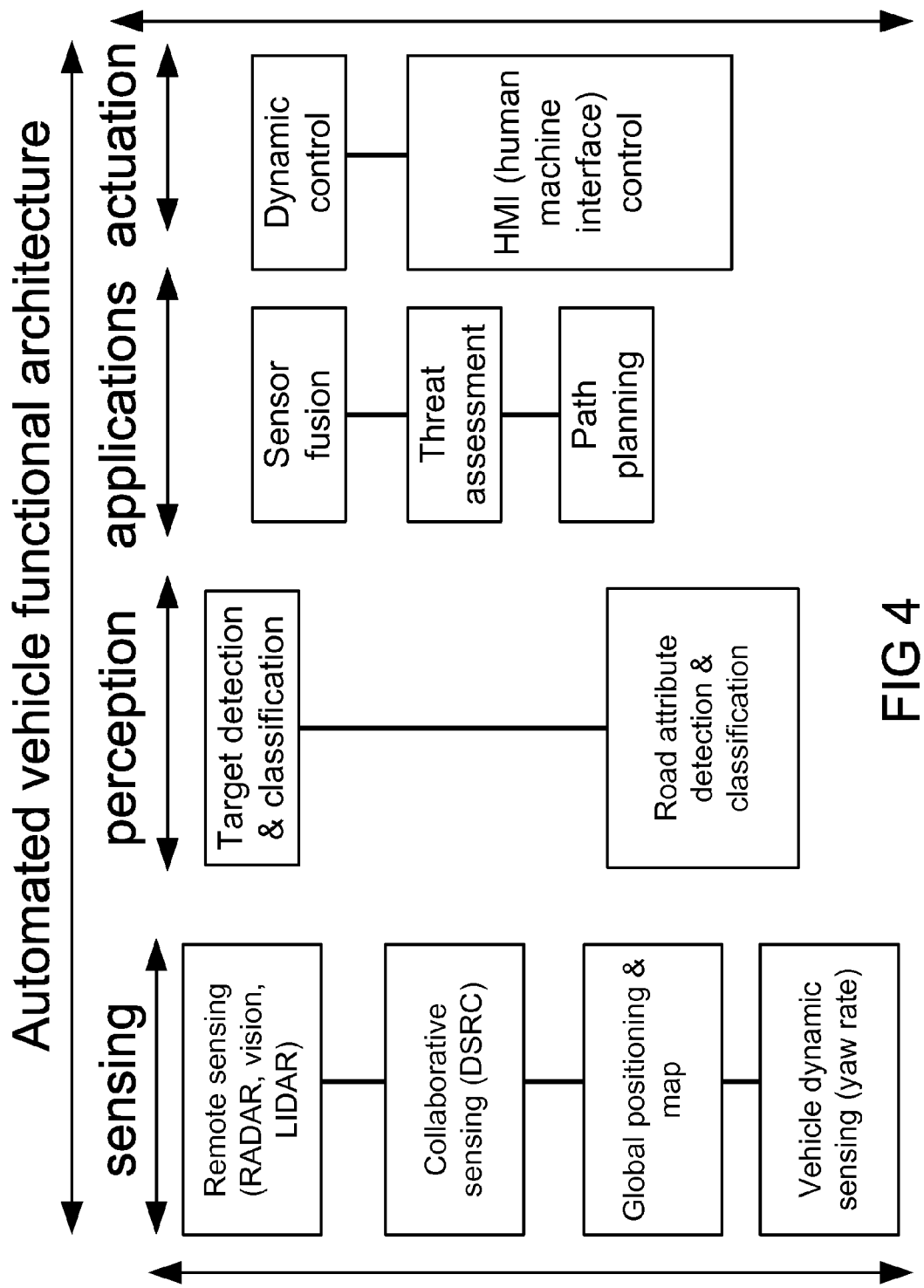
FIG. 4 is for one embodiment of the invention, for automated vehicle functional architecture.
Figure 5:
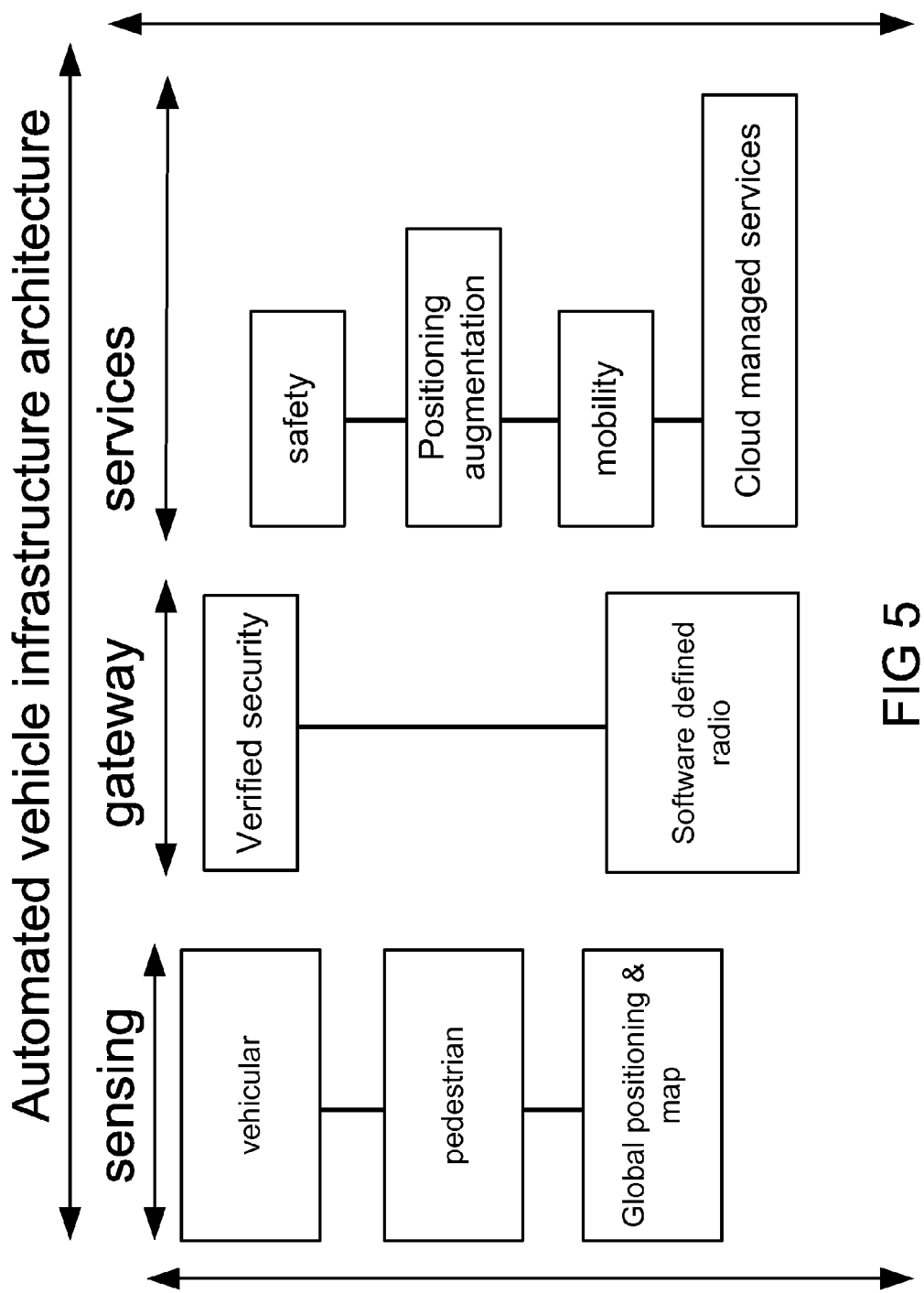
FIG. 5 is for one embodiment of the invention, for automated vehicle infrastructure architecture.

FIG. 4 is for one embodiment of the invention, for automated vehicle functional architecture, for sensing, perception, applications, and actuation. FIG. 5 is for one embodiment of the invention, for automated vehicle infrastructure architecture, for sensing, gateway, and services.

Figure 6:
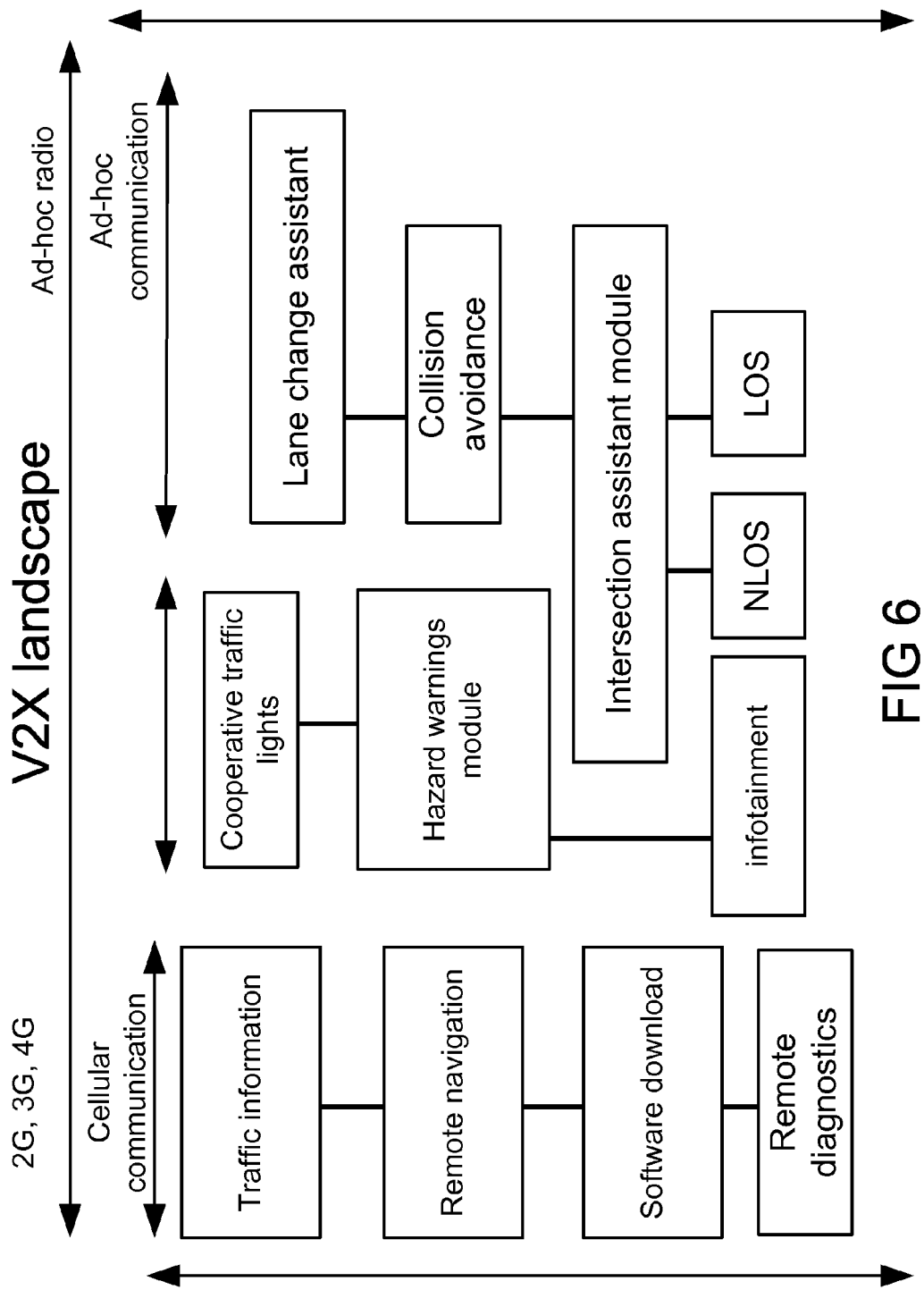
FIG. 6 is for one embodiment of the invention, for a system for V2X landscape, with components.
Figure 7:
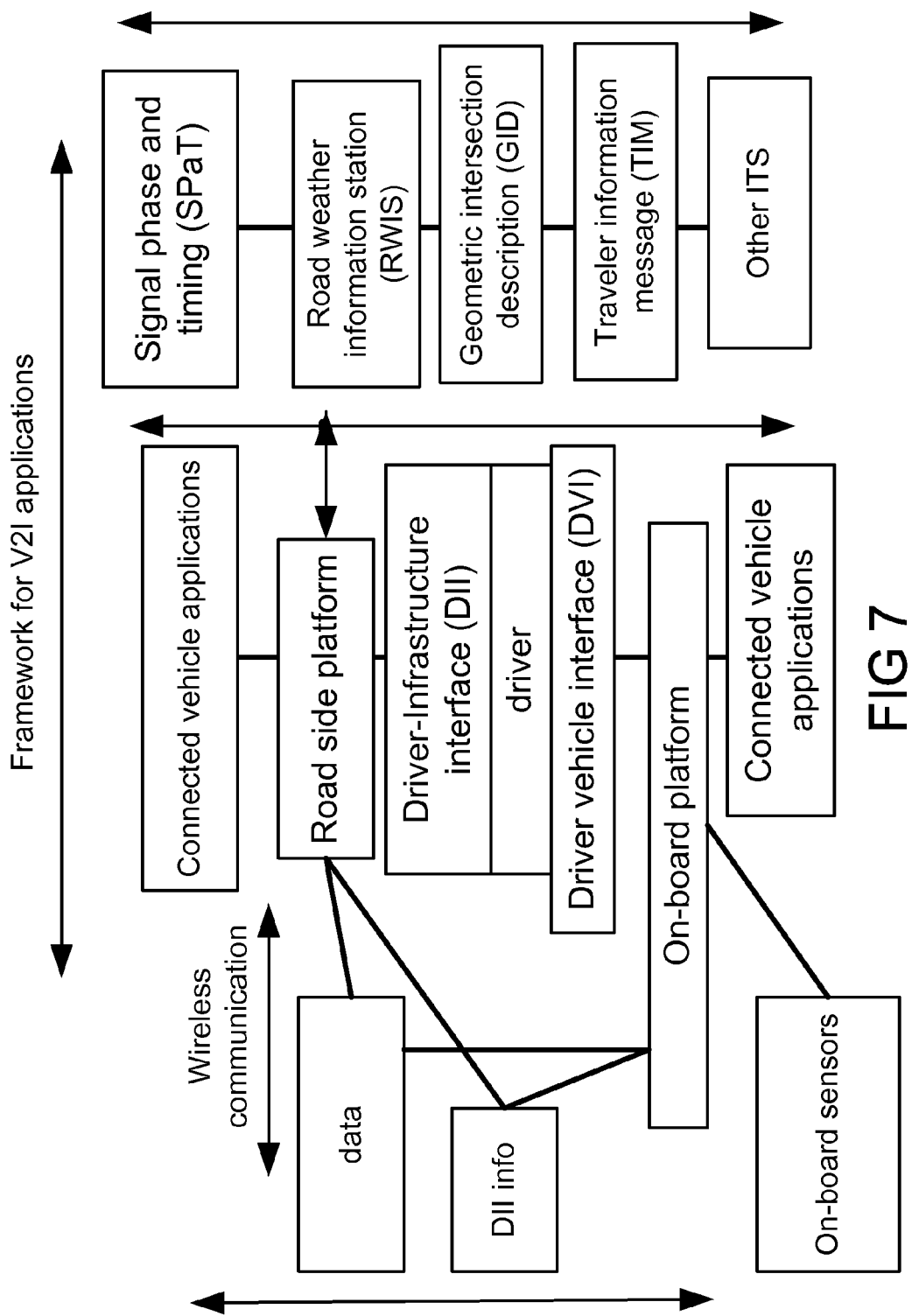
FIG. 7 is for one embodiment of the invention, for a system for framework for V2I applications, with components.

FIG. 6 is for one embodiment of the invention, for a system for V2X landscape, with components, for spectrum and range of frequencies and communications, for various technologies, for various purposes, for different ranges. FIG. 7 is for one embodiment of the invention, for a system for framework for V2I applications, with components, for road-side platform and on-board platform, using various messages and sensors.

Figure 8:
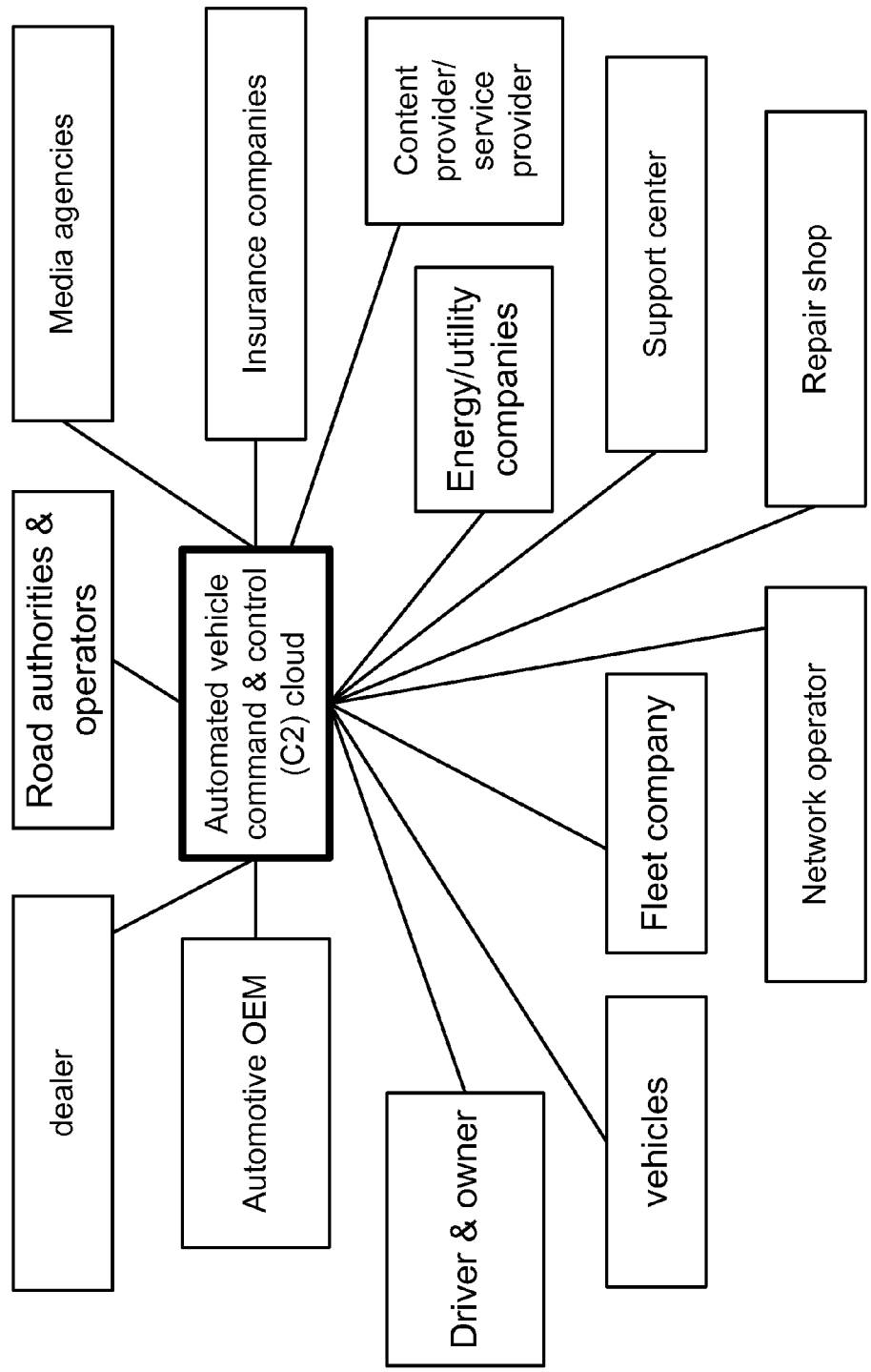
FIG. 8 is for one embodiment of the invention, for a system for automated vehicle command and control (C2) cloud, with components.
Figure 9:
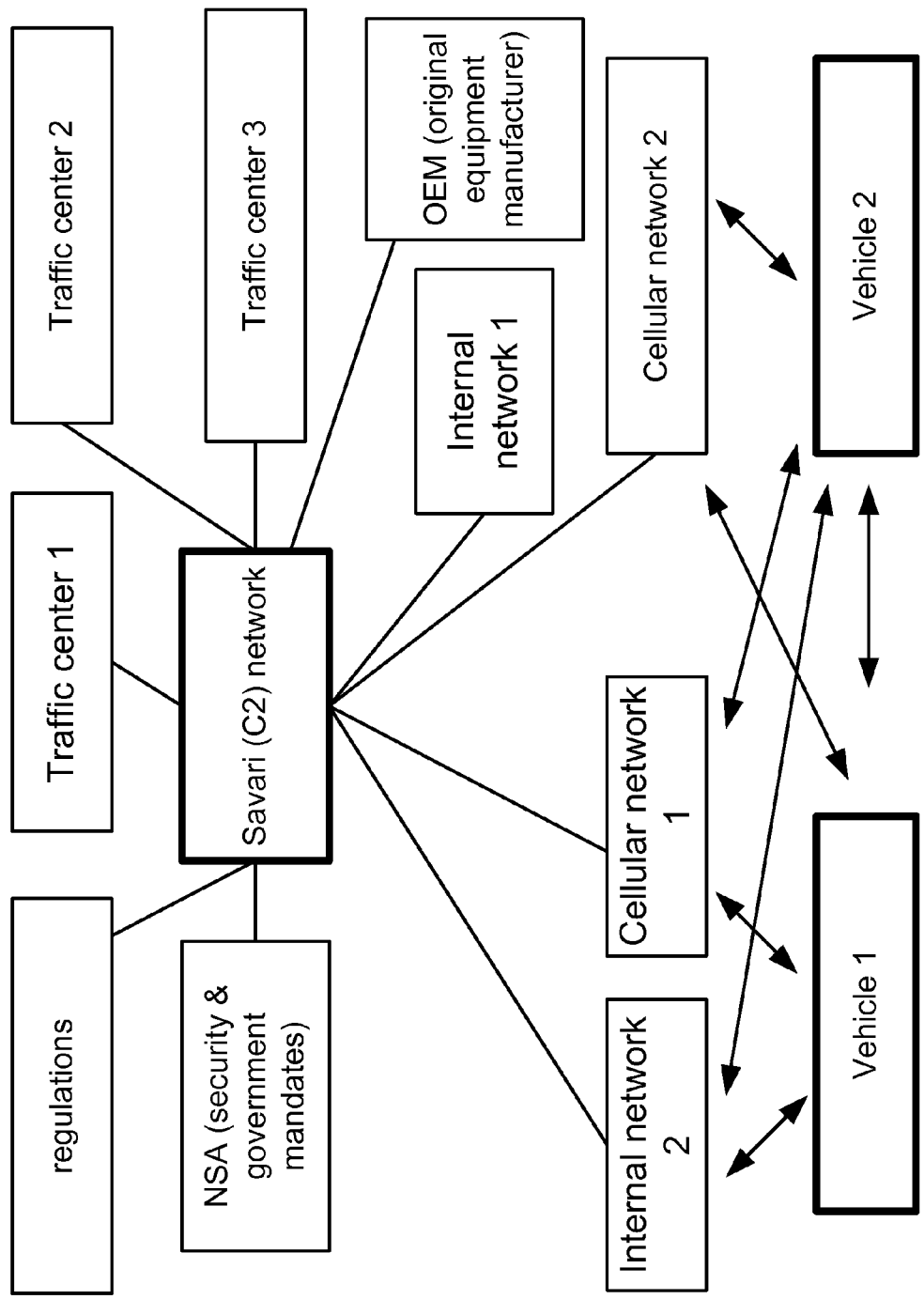
FIG. 9 is for one embodiment of the invention, for a system for Savari C2 network, with components, showing communications between networks and vehicles.

FIG. 8 is for one embodiment of the invention, for a system for automated vehicle command and control (C2) cloud, with components, with various groups and people involved, as user, beneficiary, or administrator. FIG. 9 is for one embodiment of the invention, for a system for Savari C2 network, with components, showing communications between networks and vehicles, using traffic centers' data and regulations by different government agencies.

Figure 10:
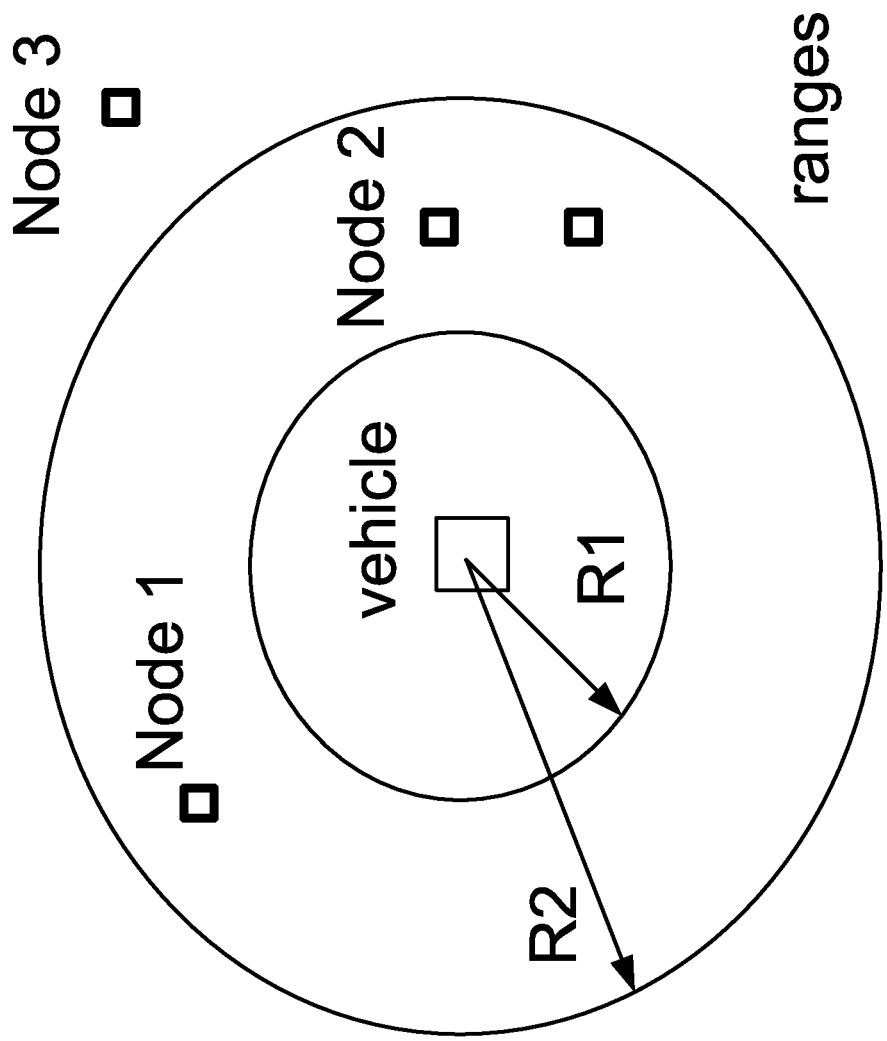
FIG. 10 is for one embodiment of the invention, for a system for host vehicle, range of R values, region(s) defined, multiple nodes or vehicles inside and outside region(s), for communications between networks and vehicles, and warning decisions or filtering purposes.
Figure 11:
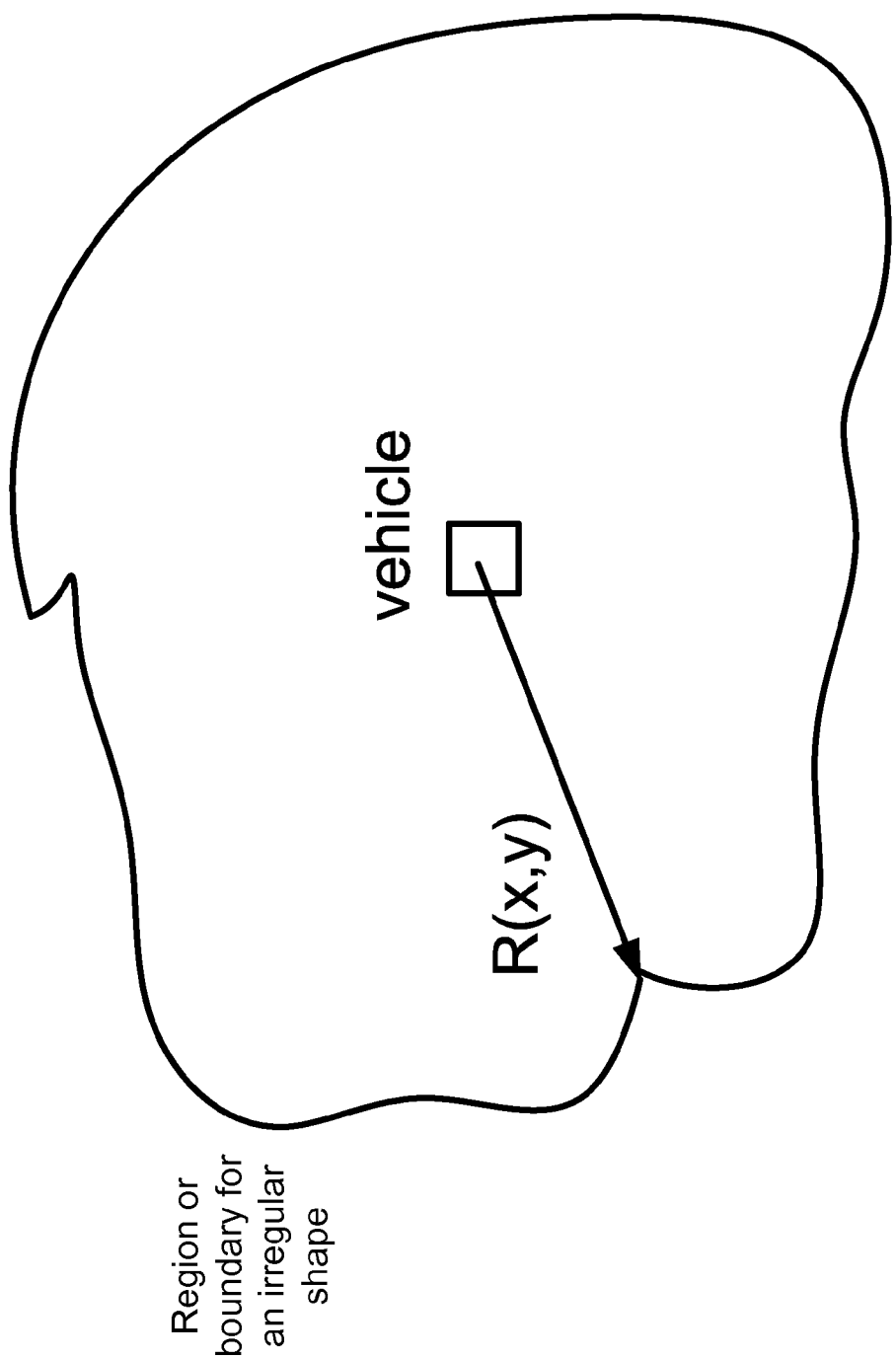
FIG. 11 is for one embodiment of the invention, for a system for host vehicle, range of R values, region(s) defined, for an irregular shape(s), depending on (x,y) coordinates in 2D (dimensional) coordinates, defining the boundaries.

FIG. 10 is for one embodiment of the invention, for a system for host vehicle, range of R values, region(s) defined, multiple nodes or vehicles inside and outside region(s), for communications between networks and vehicles, and warning decisions or filtering purposes, for various filters to reduce computations and reduce the bandwidth needed to handle the message traffic. FIG. 11 is for one embodiment of the invention, for a system for host vehicle, range of R values, region(s) defined, for an irregular shape(s), depending on (x,y) coordinates in 2D (dimensional) coordinates, defining the boundaries, or in 3D for crossing highways in different heights, if connecting.

In one embodiment, we have the following technical components for the system: vehicle, roadway, communications, architecture, cybersecurity, safety reliability, human factors, and operations. In one embodiment, we have the following non-technical analysis for the system: public policy, market evolution, legal/liability, consumer acceptance, cost-benefit analysis, human factors, certification, and licensing.

In one embodiment, we have the following requirements for AV (automated vehicles) system:
 Secure reliable connection to the command and control center
 Built-in fail-safe mechanisms
 Knowledge of its position and map database information (micro and macro maps)
 Communication with traffic lights/road side infrastructure
 Fast, reliable, and secure
 Situational awareness to completely understand its immediate surrounding environment
 Requires multiple sensors
 Algorithms to analyze information from sensors
 Algorithms to control the car, for drive-by-wire capability In one embodiment, we have the following primary technologies for our system:
 V2X communication: time-critical and reliable, secure, cheap, and dedicated wireless spectrum
 Car OBE (on-board equipment): sensor integration (vision, radar and ADAS (advanced driver assistance system)), positioning (accurate position, path, local map), wireless module (physical layer (PHY), Media Access Control (MAC), antenna), security (multi-layer architecture), processing and message engine, and algorithms for vehicle prediction and control In one embodiment, we have the following building blocks for AVs:
 Automation Platform
  i. Advanced Driver Assistance (ADAS) integration
  ii. Map Integration, Lane Control
  iii. Radio communications support
  iv. Vehicle Controller Unit to do actuation
 Base Station
  Ground positioning support to improve positioning accuracy
  V2I (vehicle to infrastructure) functionality, support for public/private spectrums
  Cloud connectivity to provide secure access to vehicles
 Command Control Center
  i. Integration with Infrastructure Providers Here are some of the modules, components, or objects used or monitored in our system: V2V (vehicle to vehicle), GPS (Global Positioning System), V2I (vehicle to infrastructure), HV (host vehicle), RV (remote vehicle, other vehicle, or $3^{rd}$ party), and active and passive safety controls.

Figure 12:
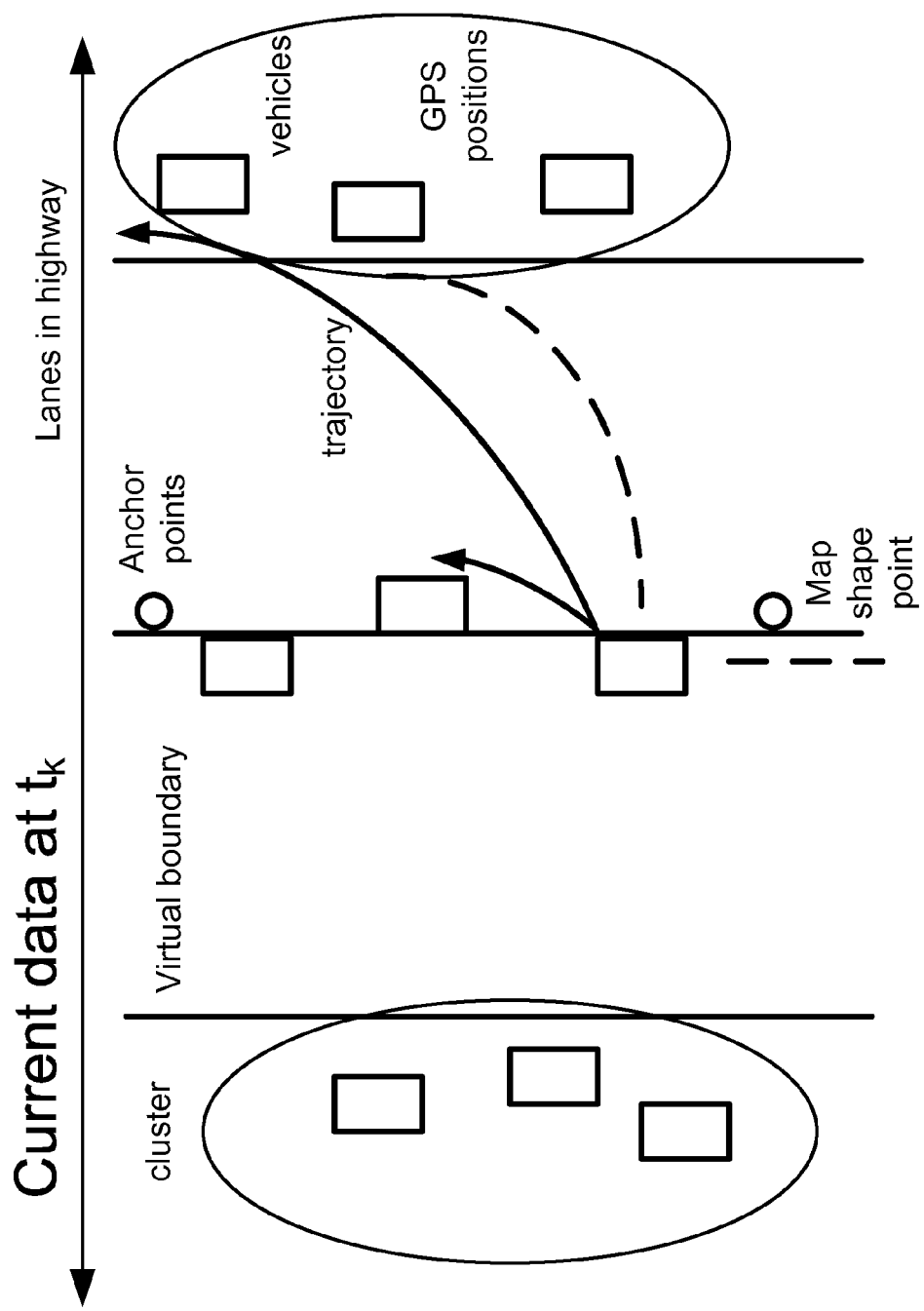
FIG. 12 is for one embodiment of the invention related to virtual boundaries and clustering vehicles.
Figure 13:
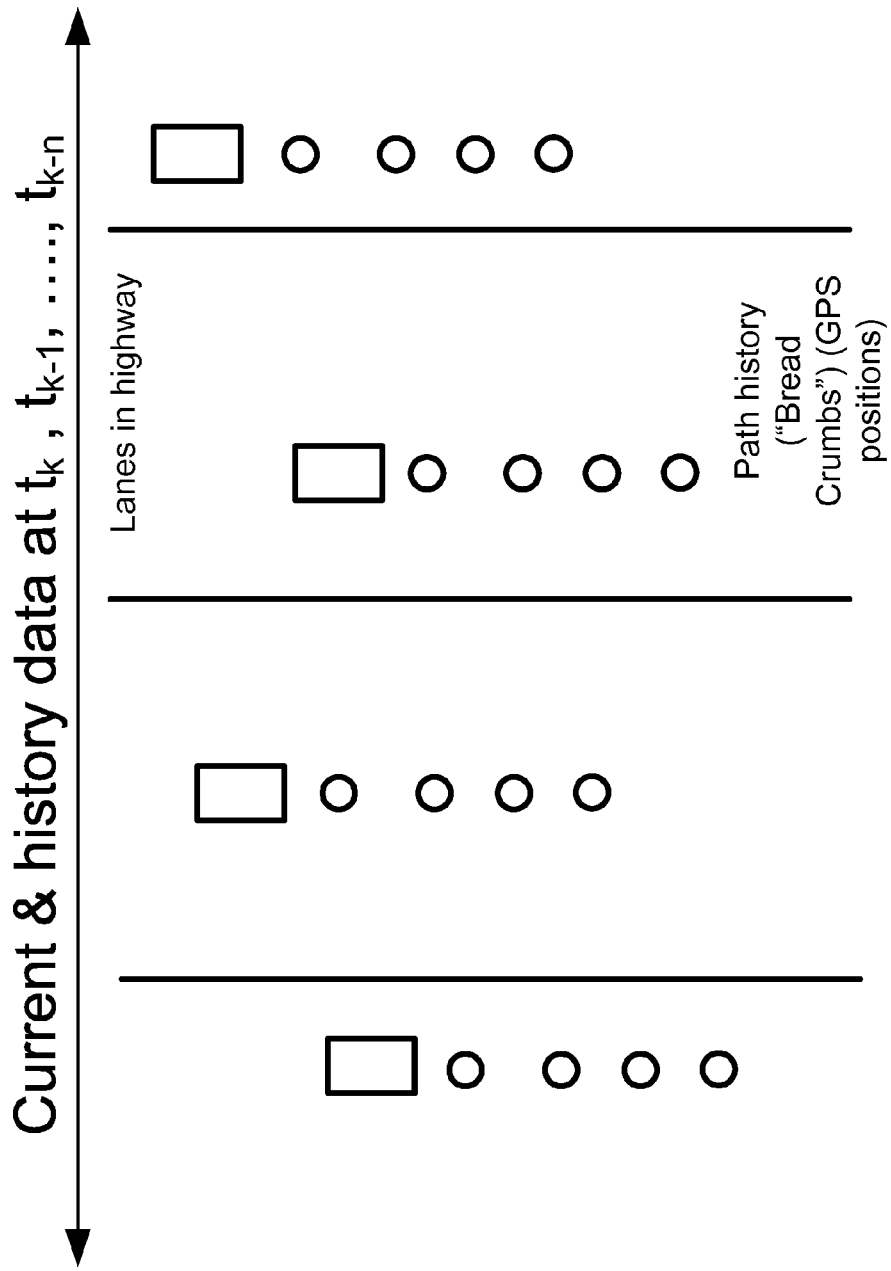
FIG. 13 is for one embodiment of the invention related to current and history of data for vehicles.

FIG. 12 is for one embodiment of the invention related to virtual boundaries and clustering vehicles, to find the location and width of the lanes, with virtual boundaries. FIG. 13 is for one embodiment of the invention related to current and history of data for vehicles, for previous times, tk to $t_{k-n}$, tracking the vehicles, e.g. with snap shots in time, in a sequence of locations.

Figure 14:
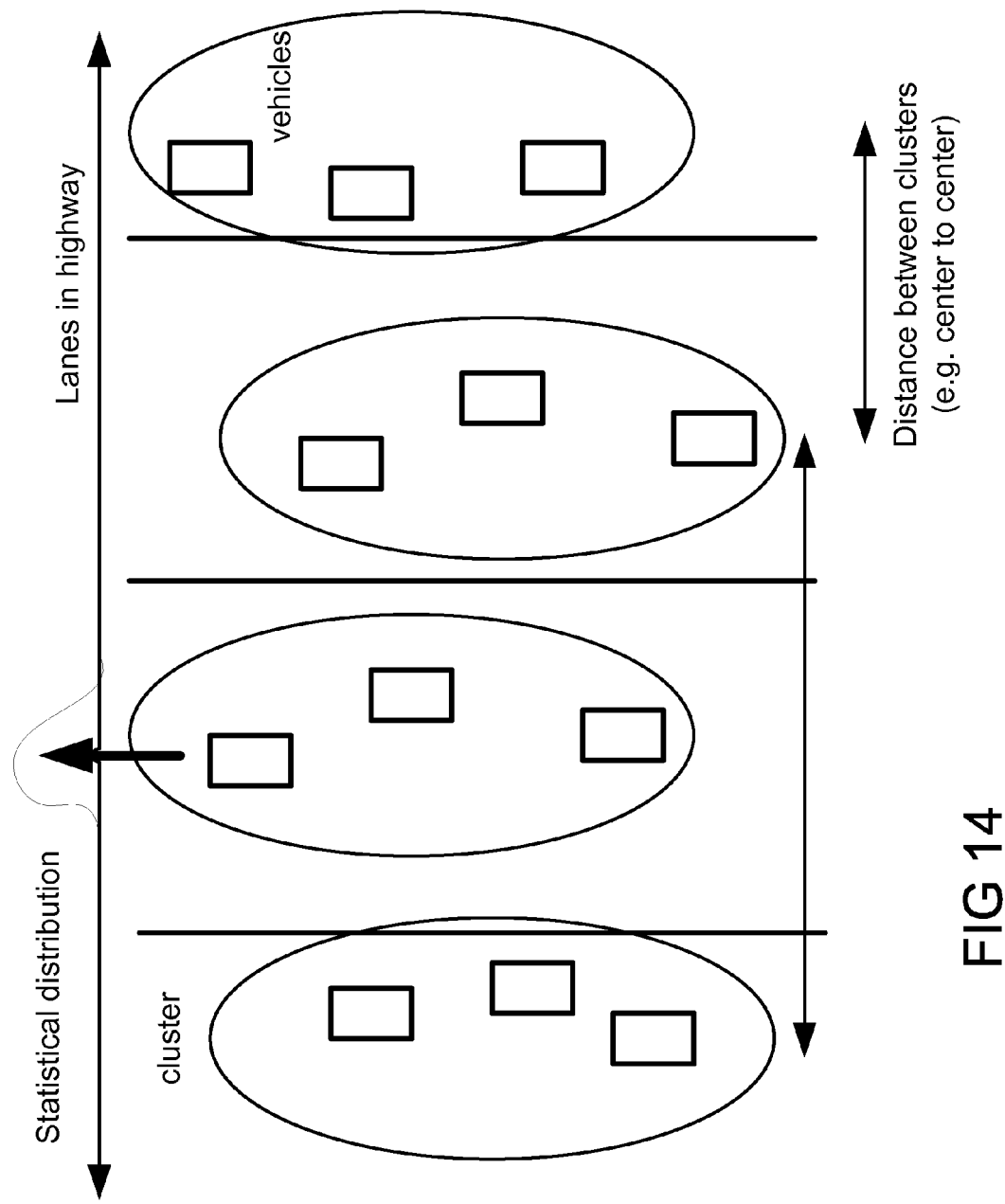
FIG. 14 is for one embodiment of the invention related to clustering, distances between clusters, and statistical distributions for vehicles.

FIG. 14 is for one embodiment of the invention related to clustering, distances between clusters (e.g. center to center, $D_{cc}$) (as a multiple integer (K) of a lane width (W)), and statistical distributions for vehicles (to distinguish the clusters, based on distribution curve/statistics, e.g. normal distribution, of the coordinates of vehicles' positions, at various time intervals). So, we have: $D_{cc}=K\,W$ wherein K is a positive integer (as 1, 2, 3, 4, ... ). Even with 2 lanes, we have 2 clusters, and one $D_{cc}$ value. Thus, we can get the value for W (with K=1). The more lanes and more clusters (and cars), the more accurate the value for W.

Figure 15:
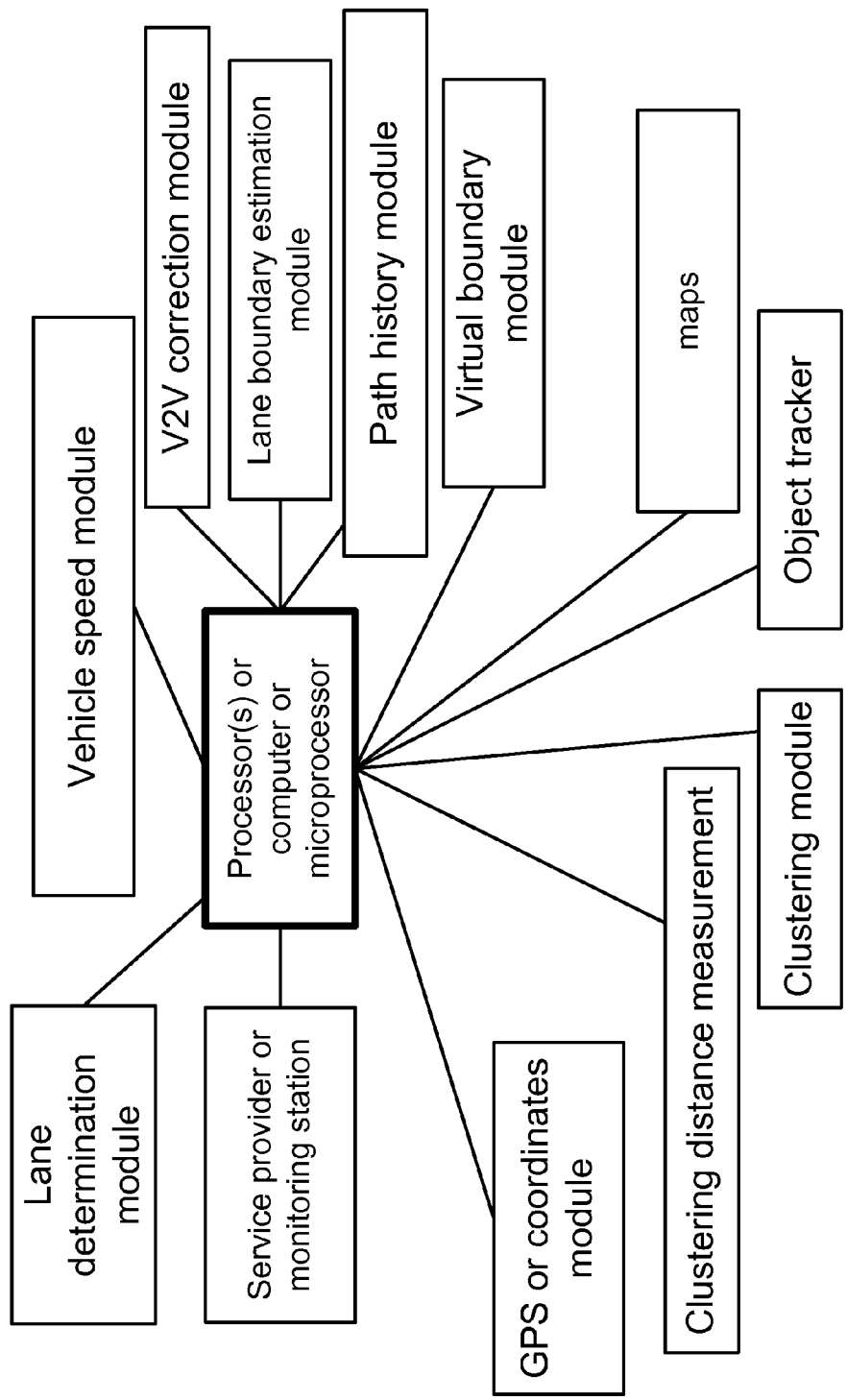
FIG. 15 is for one embodiment of the invention, for a system for lane determination.
Figure 16:
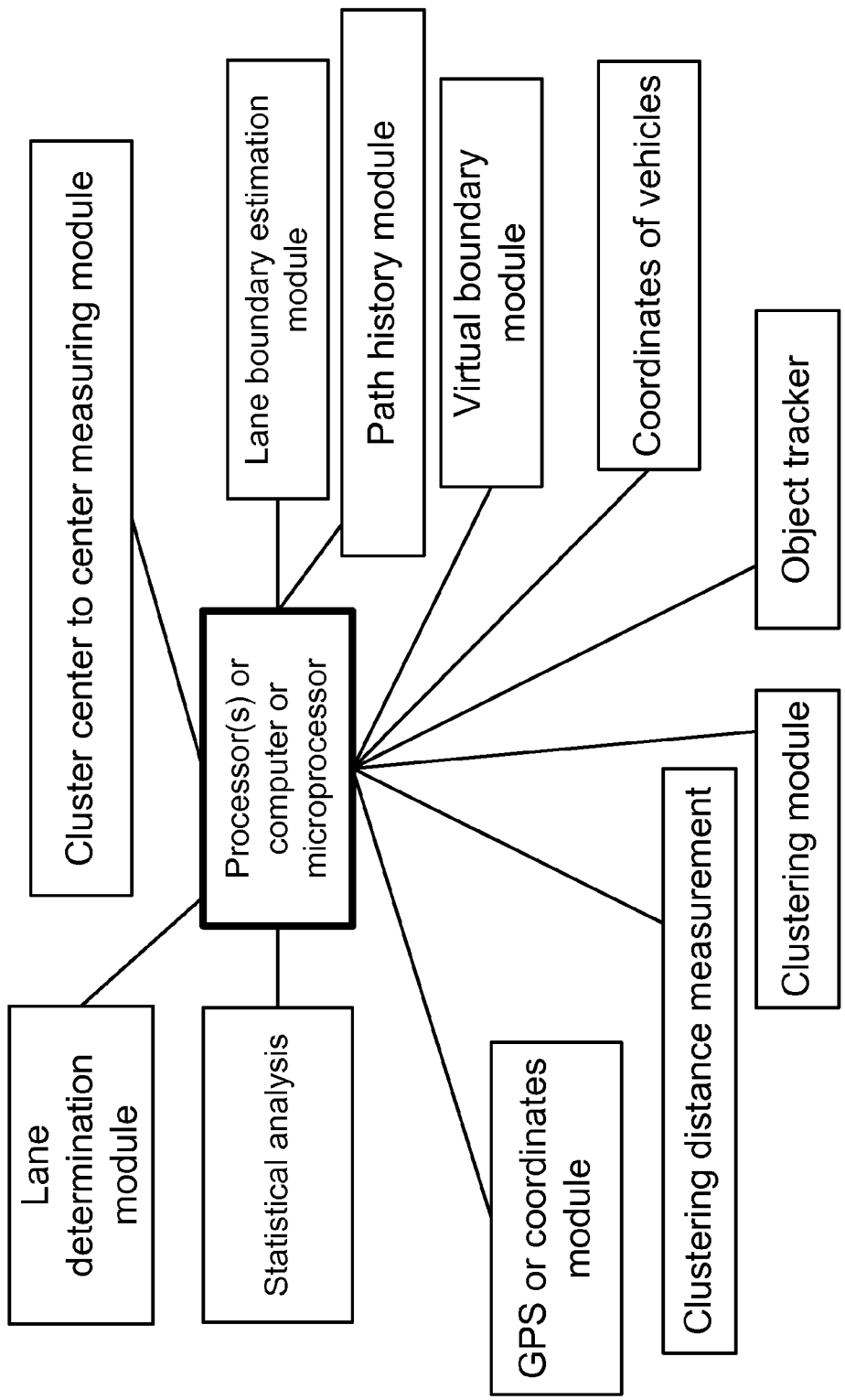
FIG. 16 is for one embodiment of the invention, for a system for clustering.

FIG. 15 is for one embodiment of the invention, for a system for lane determination, based on path history, virtual boundary, maps, GPS, and clustering analysis, determination, and distance measurements. FIG. 16 is for one embodiment of the invention, for a system for clustering, based on statistical analysis, distance measurements, and history, e.g. matching and setting the center of the corresponding cluster with the location of peak of the statistical curve in FIG. 14, in each of the 2 dimensional axes, for X and Y coordinates. This gives us the 2 coordinates of the cluster center for each cluster. Then, from those coordinates, the distances between the centers of the 2 clusters can be obtained, in each direction or axis, as a subtraction or difference of values, which yields the width of a lane, in one of those 2 directions.

Figure 17:
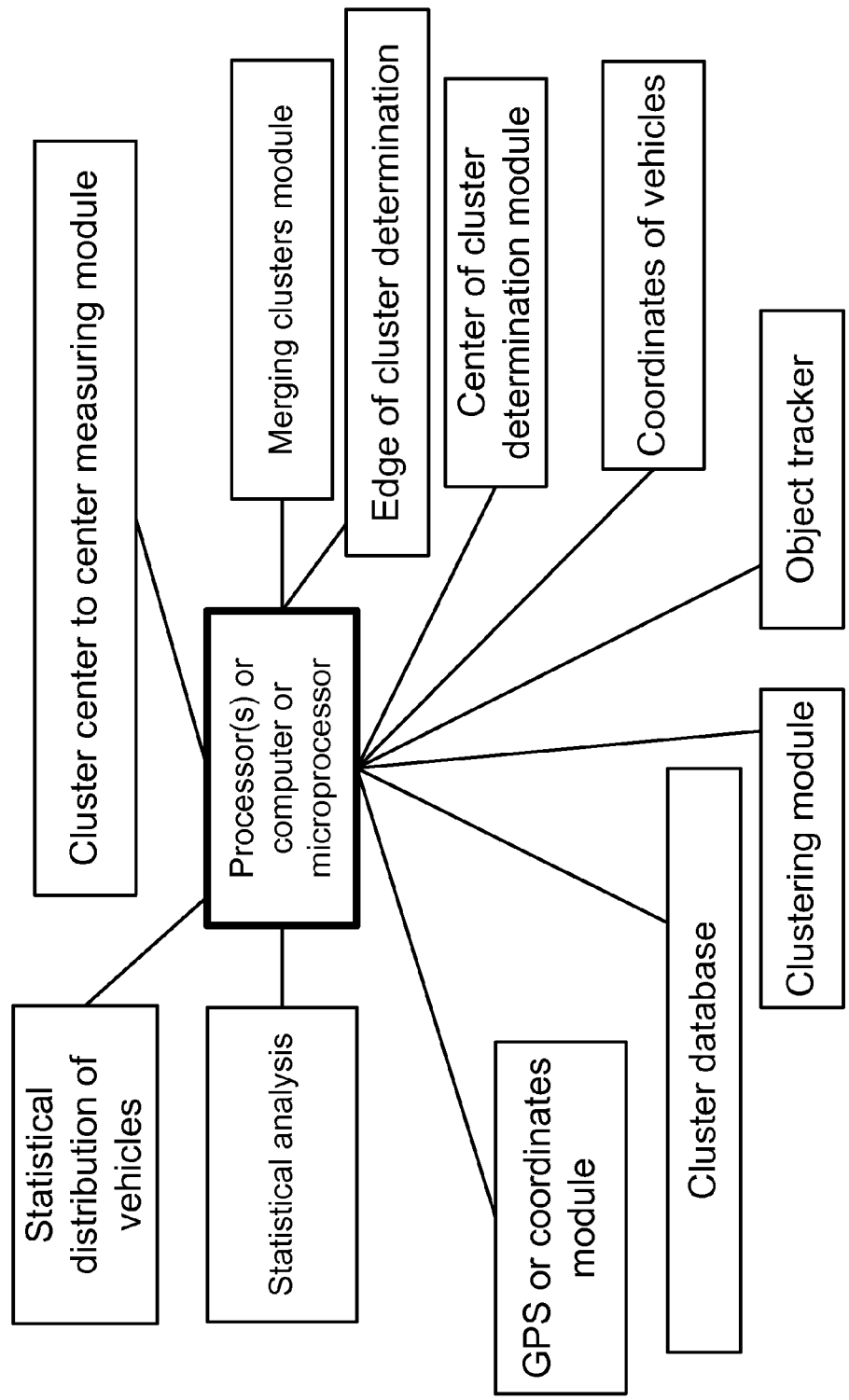
FIG. 17 is for one embodiment of the invention, for a system for clustering and cluster analysis.

FIG. 17 is for one embodiment of the invention, for a system for clustering, based on statistical analysis, statistical distribution of vehicles, clusters' center-to-center measurements, merging overlapping clusters (if they belong to the same cluster), edge of cluster determination, and coordinates of vehicles, to determine regions and lanes, as shown above.

Here, we describe a method, as one embodiment, for Lane Boundary Estimation:

The lane boundary estimation method uses fused data from nodes (vehicles) current positions, positions history (path history), host vehicle position and path history, host vehicle dynamics (speed, yaw rate, and for some embodiments, acceleration), map database geometrical shape points and attributes, and the dynamic of the vectors that connect the host vehicle with other remote vehicles. (See FIGS. 12-14.)

To estimate the lane boundaries locations (virtual boundaries), it is required to estimate the road shape, lane width, and a placement technique. To do that, let us look at FIG. 12 and FIG. 13, as an example:

The map database provides very accurate representation of the geometric shape of the road.

The path history can also provide a good representation of the road geometry.

The vehicles (nodes) positions distribution can also provide a good representation of the road geometry. If there are not enough vehicles to estimate road geometry, a combined path history and current vehicles distribution can be used to estimate the road geometry, to extrapolate or interpolate between them.

Based on the estimated geometry, the vehicles can be grouped/clustered in each lane. This can be performed using a straight piecewise clustering algorithm, spline-based, or an incremental clustering algorithm. Other methods may also be used. Basically, when the road curvature data is available, any clustering method will be based on matching the vehicle positions to a longitudinal grid of the road representation. (See FIGS. 12-14.)

Only vehicles that their heading angle measurement (GPS measurements) aligned with the forward road heading will have high confidence to be a good data. The vectors can be used here, as one example. As one example, the direction matching can be done by dot-products of 2 vectors (V1 and V2):

$$V1\,V2\cos\alpha$$

wherein $\alpha$ is the angle between the 2 vectors (V1 and V2). Note that for perfectly aligned vectors, we have a equal to zero, or (cos $\alpha$=1) (or at maximum value).

Once every lane cluster is established, a combination of clusters separation distances are calculated (see FIG. 12). One method is the following, as an example:

1—Calculate lateral distance (perpendicular to the road tangent) between host lane cluster and all other lane clusters, and between all lane clusters. For example, in FIG. 12, we have the average distance between cluster M (middle one) and cluster L (left one) (distance_ML), the average distance between cluster M and cluster R (right one) (distance_MR), and the average distance between clusters L and R (distance_LR).

2—Let us assume, as an example, that distance_ML=3 meter, distance_MR=4 meter, and distance_LR=7.2 meter. Then, an average lane width is between 3 and 4 meter. Therefore, distance_ML corresponds to one lane width, distance_MR corresponds to one lane width, and distance_LR correspond to two lane width. Therefore, an estimated lane width can be calculated: ((3+4+(7.2/2))/3)=3.53 meter. (See FIGS. 12-14.)

3—Now, we would like to establish where the virtual boundaries are located. The middle of the host lane is estimated (as one example) as the line that is located at the average between the line that is generated from left-shifting the right cluster line by one lane width and the line that is generated from the right-shifting the left cluster line by one lane width. (See FIGS. 12-14.)

4—Other lanes are distributed, by shifting this middle host lane by one lane width. (See FIGS. 12-14.)

5—Once middle line is established and the lane width is estimated, the virtual lane boundary locations are estimated/found (see FIGS. 12-13).

6—The number of lanes map database attributes can also be used in the above calculations, as one embodiment. For example, using the number of lanes limits or determines the width of the whole road, the location of the shoulders, and expectation of locations of the cars in different lanes. (See FIGS. 12-14.)

Next, let us look at the Host Vehicle Position and Orientation within the host lane:

Now, the left and right host vehicle virtual boundaries and host vehicle middle lane are estimated. The host vehicle position is known. Therefore, the vehicle position with respect to the middle line and/or to the left and right boundaries can be easily calculated from the above values (see FIGS. 12-13), using difference of distances or values (see FIGS. 12-13), as they all refer to the same position or location on the road (or on the road coordinate system), from both ways.

The heading angle of the road at the vehicle position can be calculated from the road geometry estimation. Also, the vehicle heading angle is obtained from the GPS data. Therefore, the heading angle with respect to the lane can be calculated easily by differencing the two values. These two parameters (position and heading angle with respect to the host lane) can be used to design an LDW system, as an example.

Another method to do the estimating of these two parameters is using modeling and estimation. All of the above measurements, in addition to the vector representation that connect the host vehicle with other vehicles and the host vehicle yaw rate, can be fused together (in a state model), to estimate these two main parameters (position and heading with respect to the lane). For example, we have:

$$dD/dt=\sin(\text{Heading})*\text{HostSpeed}$$

$$d\text{Heading}/dt=\text{RoadCurvature}-(\text{HostSpeed}*\text{YawRate})$$

$$d\text{RoadCurvature}/dt=0$$

wherein D is the distance from the middle of the host lane, Heading is the heading or direction or angle with respect to the road, RoadCurvature is the curvature of the road, "t" is the time, HostSpeed is the speed of the host vehicle, YawRate is the rate of yaw (e.g., related to vehicle's angular velocity, or e.g., which can be measured with accelerometers, in the vertical axis), and (d( )/dt) denotes the derivative of a function or a variable with respect to variable "t".

Other models of curvature can also be used, such as the Clothoid model. For the Clothoid, e.g., as one embodiment, the curvature varies linearly with respect to the parameter t. It is one of the simplest examples of a curve that can be constructed from its curvature. There are also Clothoids whose curvature varies as the n-th power of the parameter t, as another embodiment.

The measurements for the above state model can be the following parameters or set, as one example: {vector between the host vehicle and other vehicles (range and angle), curvature, heading difference, difference in position}.

Now, let us look at the advantages (comparison):

Estimating lane boundaries, when vision system does not exists, or exists, but not fully functional.

In an automated system, it will be very difficult to detect and track all lane boundaries using a vision system, due to multiple reasons: limited Field of View (FOV) coverage, difficulty seeing lane marking in high traffic scenario, or challenges facing vision system in different environment conditions (e.g., poor lane marking, challenging weather, such as ice, snow, or leaves, challenging lighting conditions, upcoming curves at nights, or the like).

Poor availability of LDW system in the above conditions, stated in the section above.

V2V active safety systems/ADAS are for vehicle to vehicle threat, and not intended for road attribute threats, such as drifting away in your lane, as in LDW system.

As shown above, the advantages of our methods are very clear over what the current state-of-the-art is, e.g. using vision systems.

In this disclosure, any computing device, such as processor, microprocessor(s), computer, PC, pad, laptop, server, server farm, multi-cores, telephone, mobile device, smart glass, smart phone, computing system, tablet, or PDA can be used. The communication can be done by or using sound, laser, optical, magnetic, electromagnetic, wireless, wired, antenna, pulsed, encrypted, encoded, or combination of the above. The vehicles can be car, sedan, truck, bus, pickup truck, SUV, tractor, agricultural machinery, entertainment vehicles, motorcycle, bike, bicycle, hybrid, or the like. The roads can be one-lane county road, divided highway, boulevard, multi-lane road, one-way road, two-way road, or city street. Any variations of the above teachings are also intended to be covered by this patent application.

The invention claimed is:

1. A method for lane boundary estimation and host vehicle position and orientation estimation, said method comprising:
a global positioning system transmitting position of one or more vehicles to a path history module;
said path history module generating history of coordinates of said one or more vehicles;
a lane boundary estimation module generating statistical distribution curves representing said history of coordinates of said one or more vehicles in each of two coordinates in two-dimensional plane;
a clustering module generating clusters based on said statistical distribution curves representing said history of coordinates of said one or more vehicles;
a lane determination module setting width and position of each one or more lanes lane in said road based on said clusters;
a processor combining results of said width and said position of each lane the one or more lanes in said road, to get an overall width and position of all of the one or more lanes in said road; and
estimating host vehicle position parameter and heading parameter with respect to one of the one or more lanes lane of a said road, comprising:
wherein said host vehicle heading parameter is an angle with respect to said road's direction;
setting differential of a first distance with respect to time equal to sine function of said host vehicle heading parameter times speed of the host vehicle;
wherein said first distance is a distance from middle of a host lane, corresponding to said host vehicle;
setting differential of said host vehicle heading parameter with respect to time equal to a curvature of said road minus product of said speed of said host vehicle times rate of yaw for said host vehicle's angular velocity, with respect to vertical axis;
setting differential of said curvature of said road with respect to time equal to zero.

2. The method as recited in claim 1, said method comprising:
averaging results of said width of the one or more lanes in said road.

3. The method as recited in claim 1, said method comprising:
averaging results of said position of the one or more lanes in said road.

4. The method as recited in claim 1, said method comprising:
weighted-averaging results of said width of the one or more lanes in said road.

5. The method as recited in claim 1, said method comprising:
weighted-averaging results of said position of the one or more lanes in said road.

6. The method as recited in claim 1, said method comprising:
centering said clusters based on said statistical distribution curves.

7. The method as recited in claim 1, said method comprising:
determining virtual boundary line.

8. The method as recited in claim 1, said method comprising:
recording and storing said history of coordinates of said one or more vehicles.

9. The method as recited in claim 1, said method comprising:
generating said clusters based on a single vehicle.

10. The method as recited in claim 1, said method comprising:
generating said clusters based on multiple vehicles.

11. The method as recited in claim 1, said method comprising:
generating said clusters based on a single vehicle in a single lane.

12. The method as recited in claim 1, said method comprising:
generating said clusters based on multiple vehicles in a single lane.

13. The method as recited in claim 1, said method comprising:

generating said clusters based on a single vehicle in multiple lanes.

14. The method as recited in claim 1, said method comprising:
    generating said clusters based on multiple vehicles in multiple lanes.

15. The method as recited in claim 1, said method comprising:
    upon a lane change event, giving warning for said lane change event.

16. The method as recited in claim 1, said method comprising:
    upon a lane change event, giving warning for said lane change event with sound.

17. The method as recited in claim 1, said method comprising:
    upon a lane change event, giving warning for said lane change event with light.

18. The method as recited in claim 1, said method comprising:
    using a road map.

19. The method as recited in claim 1, said method comprising:
    measuring distance between said clusters.

20. The method as recited in claim 1, said method comprising:
    measuring distance between centers of said clusters.

21. The method as recited in claim 1, said method comprising:
    said lane determination module using map attributes.

22. The method as recited in claim 1, said method comprising:
    said lane determination module using shape points.

23. The method as recited in claim 1, said method comprising:
    said lane determination module using number of lanes.

24. The method as recited in claim 1, said method comprising:
    said lane determination module using road structure.

25. The method as recited in claim 1, said method comprising:
    matching the host vehicle position to longitudinal grid of road representation.

26. The method as recited in claim 1, said method comprising:
    determining a curvature using Clothoid model.

* * * * *